April 29, 1941.  H. E. MILLS ET AL  2,240,340
STOVE
Filed Aug. 21, 1936
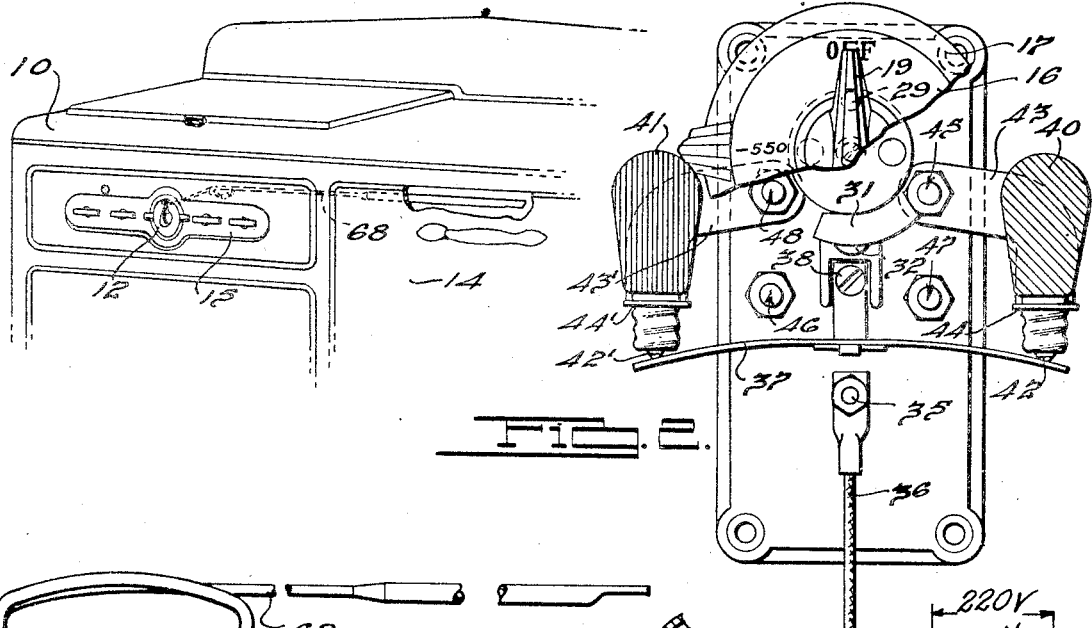
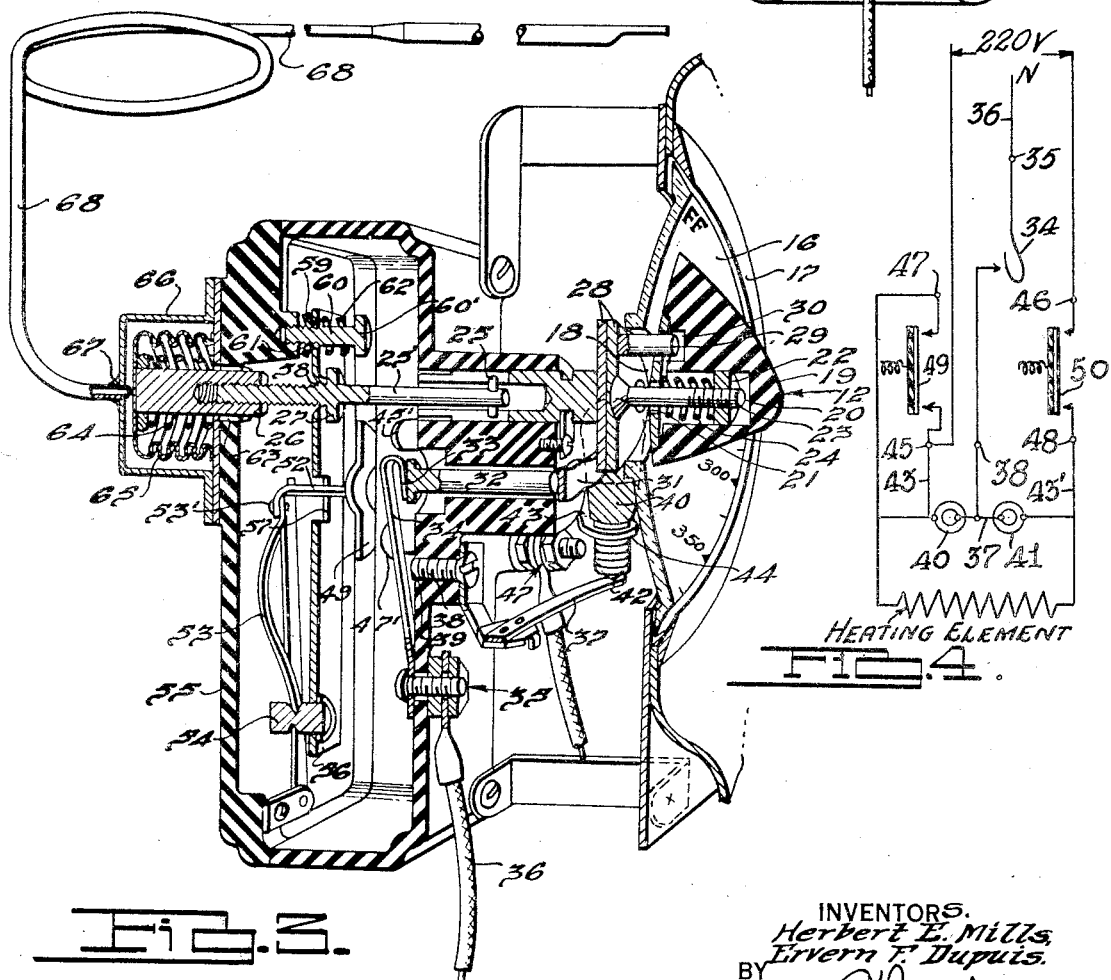
INVENTORS.
Herbert E. Mills,
Ervern F. Dupuis.
BY
ATTORNEY Patented Apr. 29, 1941

2,240,340

UNITED STATES PATENT OFFICE 2,240,340

STOVE

Herbert E. Mills and Ervern F. Dupuis, Detroit, Mich., assignors to Borg-Warner Corporation, a corporation of Illinois Application August 21, 1936, Serial No. 97,124

2 Claims. (Cl. 177—311)

This invention relates to stoves and has particular reference to an improvement in a thermostatic control therefor.

It is the principal object of the invention to provide a novel form of thermostatic control whereby the operator can tell when the oven is on and when it is at the desired temperature.

Another object of the invention is to provide a novel form of thermostatic control whereby a closing of one circuit is revealed by the illumination of one colored lamp, and a closing of another circuit is revealed by the simultaneous illumination of another colored lamp.

Another object of the invention is to provide a novel form of thermostatic control whereby a closing of one circuit is revealed by the illumination of one colored lamp, and a closing of another circuit is revealed by the simultaneous illumination of another colored lamp, said second named lamp being adapted to flicker on and off when the oven is at its desired temperature.

Another object of the invention is to provide a novel form of thermostatic control particularly adapted to be used in connection with stoves of the domestic type.

Another object of the invention is to provide a novel form of thermostatic control which is inexpensively constructed and operated and particularly adapted for revealing the conditions within the oven compartment by means of lamps of small wattage.

Another object of the invention is to provide a thermostatic control which is especially adapted to utilize the energy of electricity and the energy of heat for acquiring the desired series of results capable of being acquired from this novel type of apparatus at the lowest possible cost.

Another object of the invention is to provide a thermostatic control which consists of a necessary series of circuits and lamps, skillfully and novelly hooked up, which will indicate, when a switch is turned on, that the oven is on, and which will indicate, also, that the oven has reached its desired temperature.

Other objects of the invention will be apparent from a reference to the following specification taken in conjunction with the accompanying drawing of which there is one sheet, and in which:

Figure 1 is a perspective view of a portion of a stove embodying the invention;

Figure 2 is a front elevational view of the control shown partly in section; and Figure 3 is an elevational perspective view of the control, greatly enlarged, and shown in section.

Fig. 4 is a circuit diagram of the control in its open or off position.

Figure 1 shows a stove 10 with a thermostatic control, generally indicated at 12, and disposed on panel 15. Thermostat 12 comprises a translucent dial 16 rigidly mounted to panel 15 and having impressed thereon numbers representing selective temperatures. Acting as a breakage preventative for dial 16 is a metal frame 17 which covers the periphery of said dial but does not obscure the numerals thereon. Dial 16 is provided with a centrally located cavity 18. A switch 19, adapted for rotative manipulation, extends forwardly of dial 16 for manual selection of the oven heat desired; this switch is appropriately shaped to form an indicator of familiar appearance; it is provided with an inner bore 20 adapted for fixed engagement therein of a plunger 22 which is fixedly screwed to a bolt 23 and resiliently backed up by a spring 24, said spring telescoping bolt 23 behind plunger 22.

Bolt 23 extends rearwardly through cavity 18 and is bifurcated at its rearward end for engagement with a transverse pin 25 which is rigidly inserted into and through a portion of a rod 25'. Rod 25' is threaded at its rearward end and screwed into an internal threaded portion of a metal retainer 26. Rod 25', being limited in its rearward motion by shoulder 27 and by a limited number of threads in retainer 26, and being connected to bolt 23 by pin 25, prevents switch 19 from being turned more than a little less than a full turn. It can be seen that adjustments can be made to prevent excessive turning of switch 19 either by adjusting rod 25' or by adjusting plunger 22 on bolt 23. Between the bifurcated end of the bolt 23 and the spring 24 is a plurality of metal discs 28 which are rigidly connected to bolt 23 and from one of which forwardly projects a lug 29 which coactively extends into a small bore 30 in switch 19; this is another means for insuring rotative movement of bolt 23 when switch 19 is manually operated.

Disposed behind and connected to discs 28 is a metal cam 31. This cam at its lower end projects substantially rearwardly and prevents forward motion of a spring-pressed non-conducting plunger 32 which is adapted for horizontal sliding motion in the control housing. Disposed behind and having its upper portion pressing against plunger 32 at 33 is a copper spring 34 the lower end of which is connected to the inner wall of the control housing forming a terminal, generally indicated at 35, to which neutral wire 36 is connected. A neutral conductor 37 is secured to the control housing by a conducting screw 38 which extends into and through the housing to within a short distance of spring 34. Forward motion of plunger 32 allows spring 34 to contact screw 38 at 39.

A green lamp 40 and a red lamp 41 are adapted to be resiliently contacted from below by conductor 37 at 42 and 42' respectively, and to be screwed into metal brackets 43 and 43' respectively, at 44 and 44' respectively. Lamps 40 and 41 are preferably 7 watt bulbs and disposed behind translucent dial 16.

45 and 46 represent, generally, the terminals to which a 220 v. source is connected. 47 and 48 represent, generally, the terminals to which a heating element is connected. The terminals 45 and 46 project electrically through the control housing and terminate at the inner side thereof at contacts 45' and 46' (the latter not shown). The terminals 47 and 48 project electrically through the control housing and terminate at the inner side thereof at contacts 47' and 48' (the latter not shown).

Metal conducting bracket 43 forms the electrical continuity between neutral conductors 36 and 37, green lamp 40, and terminal 45; metal conducting bracket 43' forms the electrical continuity between neutral conductors 36 and 37, red lamp 41, terminal 48, a switch 50, and terminal 46. Disposed behind and level with terminals 45' and 47' is a continuous metal contactor 49 which is capable of being sprung forwardly (when switch 19 is operated) so that the upper and lower portions thereof contact 45' and 47' respectively; disposed similarly with relation to terminals 48', and 46' is a continuous metal contactor 50 (not shown) which springs forwardly, the upper and lower portions of which contact 48' and 46', respectively, when switch 19 is turned on. Insulation lies between and behind contactors 49 and 50, since these contactors are used for closing the circuit containing the heating element and the circuit containing the red lamp. This insulation is comprised of a Bakelite block 51 (not shown) pivoted at the center for slight movement in a horizontal plane for automatic adjustment of the pressure between contacts 49, 45', and 47', and between contacts 50, 48', and 46'. A thin L shaped bar 52 extends rearwardly and horizontally from the pivotal point of block 51, and then downwardly to contact with a spring 53 at 53'. Spring 53 is bifurcated at its lower end and engageably fitted to a bolt 54. The rear end of bolt 54 serves as a stop while switch 19 is in its "off" position, said stop being limited in its rearward motion by the rear cover plate 55 of the control housing; the forward end of the bolt 54 is rigidly fastened to the lower end of a spring 56. A center portion 57 of spring 56 is cut out so that bar 52 can extend therethrough, a portion 58 of spring 56 is cut out above 57 so that rod 25' can extend therethrough, and a portion 59 of spring 56 is cut out above 58 so that a bolt 60 can pass therethrough.

The rearward end of bolt 60 is threaded and engageable with a threaded portion of plate 55 at 61; the forward end of bolt 60 is flanged at 60' so as to retain a telescopical coil spring 62 therebehind and in front of spring 56. This coil spring 62 is sufficiently strong enough to keep the top portion of spring 56 stationary and in place regardless of the conditions in the control unit. It will be seen, therefore, but explained subsequently, that forward motion of rod 25' will allow the portion of spring 56 lying below bolt 60 to be sprung forwardly; this forward motion of the lower portion of spring 56, since spring 56 is rigidly connected to the lower portion of spring 53 by means of bolt 54, will allow the lower portion of spring 53 to be sprung forwardly; this forward motion of the lower portion of spring 53 is adapted to cause the upper portion of spring 53 to be sprung rearwardly; and, since the upper portion of spring 53 is rigidly connected to bar 52 at 53', and bar 52 is connected to block 51 on which contactors 49 and 50 are mounted, rearward motion of the upper portion of spring 53 will cause contactors 49 and 50 to move rearwardly and break the circuits between 49, 45', and 47', and between 50, 48', and 46'.

Metal retainer 26 extends rearwardly from plate 55 through a portion 63 which is cut out of plate 55 for slidable movement therethrough of retainer 26. The portion of retainer 26 which so extends from plate 55 is telescoped by a coil spring 64, of predetermined strength. An optional bellows 65 may telescope spring 64. A cap 66 is removably mounted onto plate 55 by a bolting means (not shown) in order to house the spring 64 and the rear portion of retainer 26. To cap 66 at 67 is soldered or suitably connected a hollow coil 68 which is filled with a liquid of predetermined expansion characteristics. The end of the tube or coil 68 which is adjacent cap 66 is suitably coactive with the rear face of retainer 26 so that the expansion or contraction of the liquid in coil 68 will reflect itself upon retainer 26 and cause same to move accordingly; the other end of tube or coil 68 is suitably connected to the oven element and capable of transmitting the thermal conditions therein to the liquid within the tube or coil. The association between the coil 68 and the switch 19 through the usage of the various springs in the system together with the proper hooking up of the various circuits seems to have been clearly defined in the foregoing, but will be elaborated upon in the following.

The standard 3-wire domestic electric service is connected to the control unit, the 220 v. potential being connected to terminals 45 and 46, and the neutral wire of the system being connected to terminal 35. The heating element is connected to terminals 47 and 48.

Switch 19 is "off" in all figures and, as such, all circuits are open. Cam 31, as shown in Figs. 2 and 3, retains Bakelite plunger 32 in its rearwardmost position so that spring conductor 34 is kept from contacting screw contactor 38. The rear face of the upper portion of spring conductor 34, being in contact with the insulated support 51 (not shown) for metal contactors 49 and 50, prevents contactors 49 and 50 from contacting the rear portions 45', 46', 47' and 48' of terminals 45, 46, 47, and 48.

However, when switch 19 is turned from its "off" position, plunger 32 is allowed to move forwardly, causing spring conductor 34 to close the circuit containing the green light 40, and causing conductors 49 and 50 to close the circuit containing the oven heating element (not shown). The contact between conductors 34 and 38 not only causes the green lamp to be illuminated but also, upon the contact between conductor 50 and terminals 48' and 46', to cause the illumination of the red lamp. Simultaneous illumination of the two lamps 40 and 41 shows, by lamp 40, that the control is other than "off," and, by lamp 41, that the oven element is in circuit and at a temperature below that desired.

After the control has been "on" for some time, the oven element has naturally been heated and the fluid in coil 68 expanded. When the expansion is great enough to overcome the pressure of coil spring 64, retainer 26 in which rod 25' is lodged is forced forwardly and the pressure of collar 27 against spring 56 relieved. Spring 56 flies forwardly at the bottom thereof and takes with it the lower portion of spring 53. Forward motion of the lower portion of spring 53 causes rearward motion of the top portion thereof and obvious rearward motion of the insulating block 51 (not shown) upon which conductors 49 and 50 are mounted. This action breaks the circuits in which are disposed the red light and the oven element, and both the red light and the oven element cease having current pass through them. It will be noted that the green light remains unaffected because of the independence of the circuit in which same is disposed from any other circuit in the system.

The oven, after cooling somewhat, causes contraction of the liquid in coil 68 and the pressure on spring 64 is thereby relieved. This action causes the re-closing of the circuits in which the red light and the oven element are disposed, and the red light again goes on and the oven element is again subjected to the heating effect of the current passing therethrough.

It is understood that the cooling and re-heating of an oven is intermittent during a cooking operation because of the opening and closing of the door therefor and because of other conditions surrounding the oven. For that reason the unit comprised in the invention is delicately constructed to have reflected thereupon the slightest thermal changes. It will be noted that the ability of spring 64 to resist expansion of liquid in coil 68 is proportional to the degrees which switch 19 is turned.

As indicated by Fig. 4 which shows the control in its off position the heating element is energized by the closing of switches 49 and 50. The lamp 40 will be lighted by the closing of switch 34 and will remain on regardless of the position of switches 49 and 50. All three switches 34, 49 and 50 operate initially by turning the control dial. Switches 49 and 50 are also operable by the thermostatic switch as heretofore described.

The circuit for the heating element may be traced through contact 45, switch 49, contact 47, contact 48, switch 50 and contact 46.

The circuit for the lamp 40 is through contact 45, bracket 43, lamp 40, bracket 37, bolt 38, spring switch 34, contact 35 and thence to the neutral wire 36.

The circuit for the lamp 41 indicating passage of current through the heating element is through contact 46, switch 50, contact 48, bracket 43', lamp 41, bracket 37, bolt 38, spring switch 34 and contact 35 and thence to the neutral wire 36.

It is to be understood that the invention is not to be considered as limited to the embodiments and applications thereof which have been selected for the purposes of illustration, but is intended, rather, to embrace and include all other embodiments and applications of the new and useful principles thereof, which are to be considered reasonably within the scope of the appended claims.

We claim:

1. In a stove, a pair of switch terminals connected to a source of high potential, a pair of contacts having an electric heating element for the oven of said stove electrically connected thereto, a neutral line, an electric signal operatively connected to said line and to one of said terminals, a second electric signal of a different character than said first-mentioned signal operatively connected to said line and to one of said contacts, said terminals and contacts comprising a part of a control switch which includes a movable member operable for connecting said contacts to said terminals so as to energize said heating element and said second signal, means for actuating said movable member to open and close the circuit through said heating element and second signal, thermal responsive means for operating said actuating means to open and close the circuit through said heating element and second signal, and manual means for operating said actuating means so as to select the temperature range in which said thermal responsive means will operate and locking said movable member against closing the circuit when the manual means is in off position, and switch means opened by such locking action included in the circuit of at least said first-mentioned signal.

2. A construction as set forth in claim 1 in which the last-mentioned switch means is included between the neutral line and said signals.

HERBERT E. MILLS.
ERVERN F. DUPUIS.